US012606267B2

(12) United States Patent
Guillaume

(10) Patent No.: US 12,606,267 B2
(45) Date of Patent: Apr. 21, 2026

(54) FOUR-WHEELED SCOOTER-TYPE VEHICLE

(71) Applicant: R.A.D, Bonnétage (FR)

(72) Inventor: Annick Guillaume, Allan (FR)

(73) Assignee: R.A.D, Bonnétage (FR)

( * ) Notice: Subject to any disclaimer, the term of this patent is extended or adjusted under 35 U.S.C. 154(b) by 308 days.

(21) Appl. No.: 18/571,390

(22) PCT Filed: Jun. 13, 2022

(86) PCT No.: PCT/FR2022/051118
§ 371 (c)(1),
(2) Date: Dec. 18, 2023

(87) PCT Pub. No.: WO2022/263755
PCT Pub. Date: Dec. 22, 2022

(65) Prior Publication Data
US 2024/0278870 A1 Aug. 22, 2024

(30) Foreign Application Priority Data
Jun. 18, 2021 (FR) ...................................... 21/06488

(51) Int. Cl.
*B62K 5/08* (2006.01)
*B62K 5/007* (2013.01)
*B62L 3/08* (2006.01)

(52) U.S. Cl.
CPC ................ *B62K 5/007* (2013.01); *B62K 5/08* (2013.01); *B62L 3/08* (2013.01); *B62K 2202/00* (2013.01)

(58) Field of Classification Search
CPC ...... B62K 5/007; B62K 5/08; B62K 2202/00; B62K 19/30; B62K 2015/005;
(Continued)

(56) References Cited

U.S. PATENT DOCUMENTS

| | | | | |
|---|---|---|---|---|
| 4,550,926 A | * | 11/1985 | MacIsaac | B60G 3/18 |
| | | | | 280/5.509 |
| 6,382,646 B1 | * | 5/2002 | Shaw | B62K 3/002 |
| | | | | 280/87.041 |

(Continued)

FOREIGN PATENT DOCUMENTS

| | | |
|---|---|---|
| DE | 202020003218 U1 | 9/2020 |
| EP | 3500479 A1 | 6/2019 |

(Continued)

OTHER PUBLICATIONS

International Search Report dated Sep. 8, 2022; International Application No. PCT/FR2022/051118; 2 pages (English).

(Continued)

*Primary Examiner* — Justin Holmes
(74) *Attorney, Agent, or Firm* — CANTOR COLBURN LLP

(57) ABSTRACT

A vehicle having: a crossmember; a platform that pivots on the crossmember about a first median longitudinal inclination axis; two running gears each including a front wheel and a rear wheel, an arm linked to the axis of the wheel being mounted on a connecting piece so as to pivot about a steering axis, the connecting piece being mounted on the crossmember so as to pivot about a second lateral longitudinal inclination axis; a steering column mounted so as to pivot about its axis on the platform, allowing the wheels to be turned; two coupling members connecting the platform and each connecting piece in order that the inclination of the platform causes the inclination of each running gear.

20 Claims, 8 Drawing Sheets

(58) Field of Classification Search
    CPC ...... B62K 2204/00; B62K 3/002; B62K 5/01;
              B62K 15/00; B62K 21/18; B62K 5/10;
              B62L 3/08; B62J 7/06; B62J 9/21; B62J
                                                    43/28
    See application file for complete search history.

(56)                    References Cited

U.S. PATENT DOCUMENTS 11,420,703  B2     8/2022  Virag et al.
  2003/0057670  A1*    3/2003  Tuan ..................... A63C 17/01
                                                           280/87.041

FOREIGN PATENT DOCUMENTS

EP           3784554  A1     3/2021
WO        WO-03057549  A1 *   7/2003   ............ A63C 17/01
WO         2018037400  A1     3/2018

OTHER PUBLICATIONS

International Search Report dated Sep. 8, 2022; International Appli-
cation No. PCT/FR2022/051118; 4 pages (non-English).
Written Opinion dated Sep. 8, 2022; International Application No.
PCT/FR2022/051118; 8 pages (non-English).

* cited by examiner

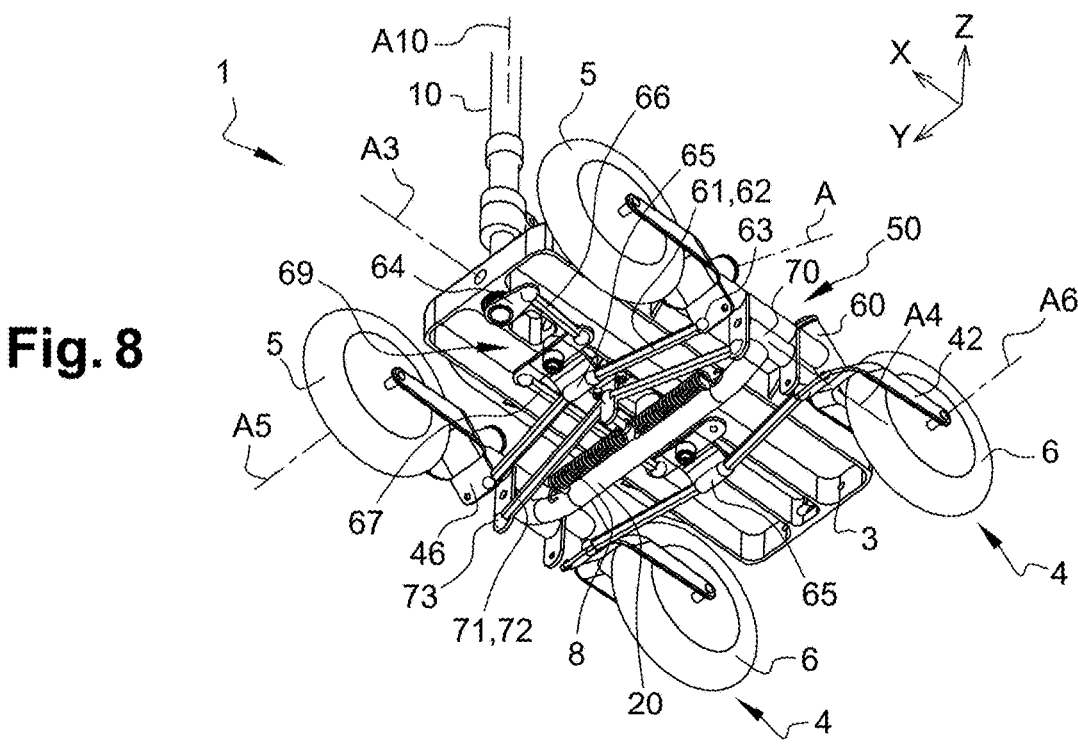
Fig. 8
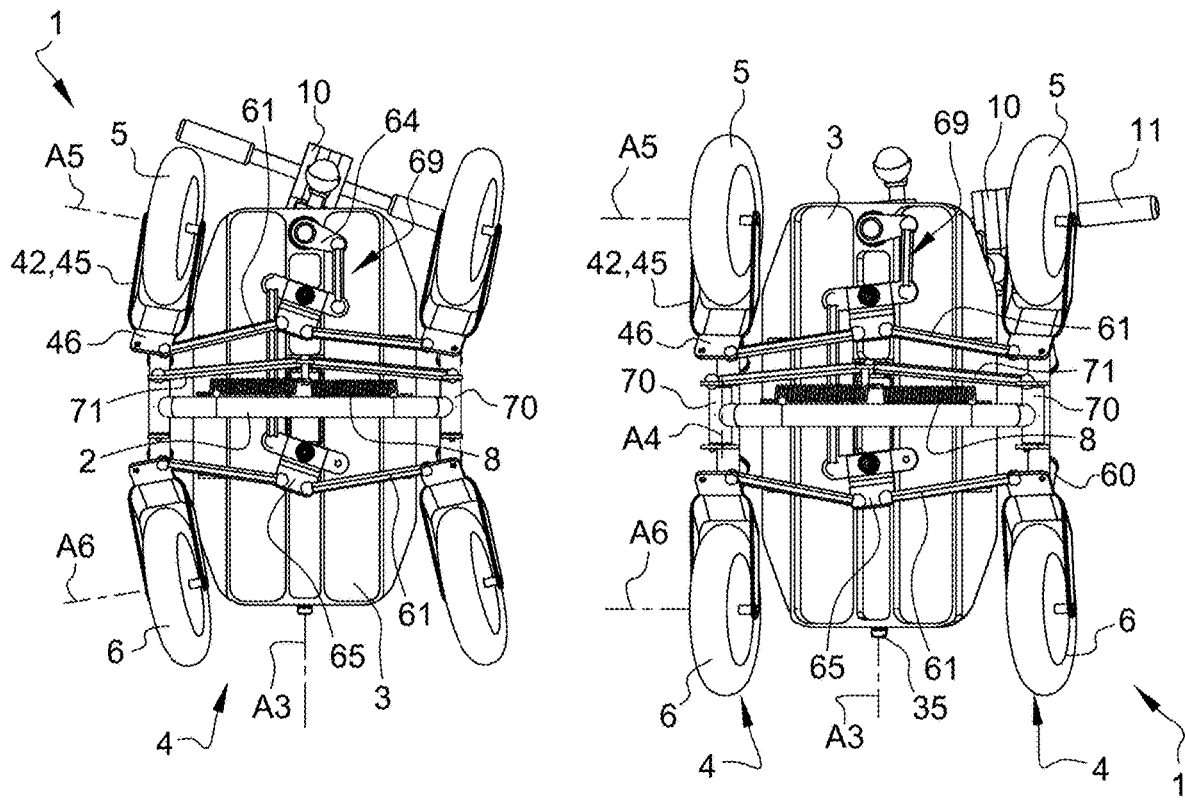
Fig. 12                     Fig. 16

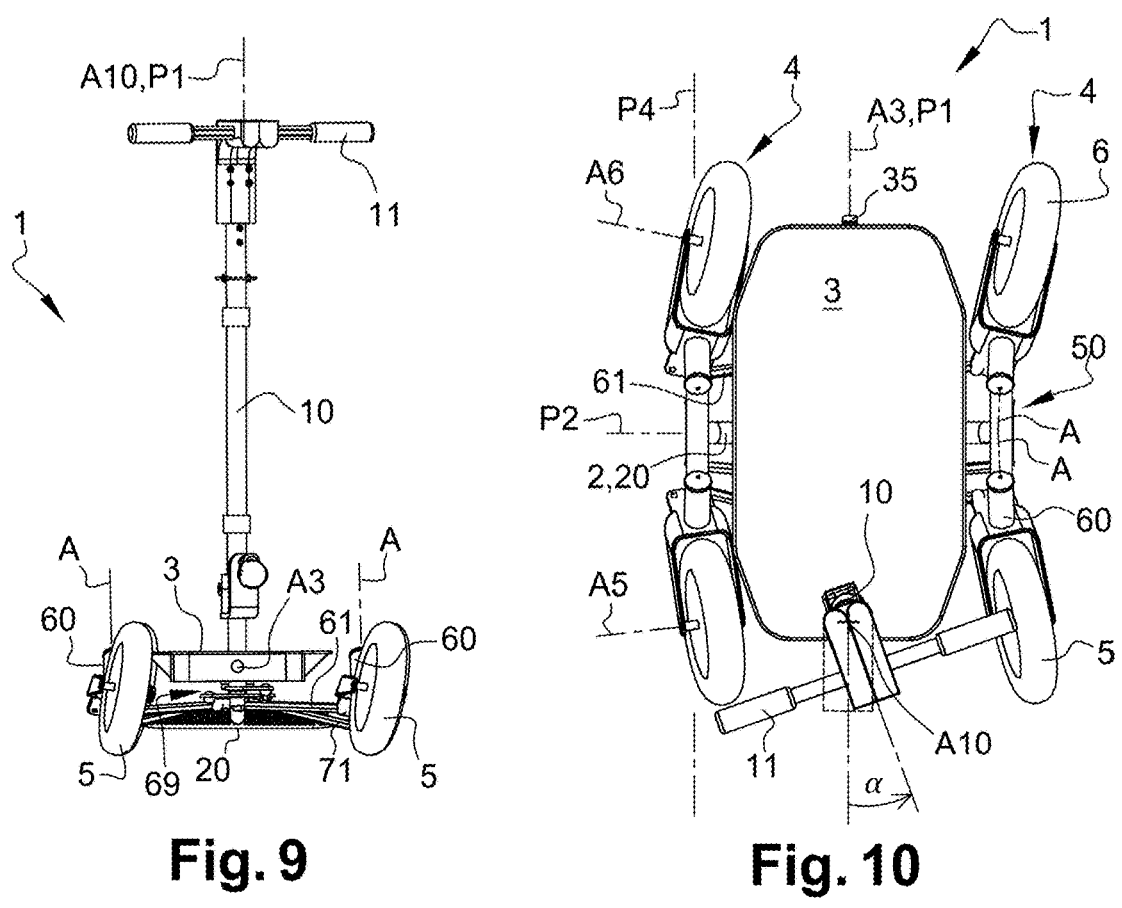
Fig. 9
Fig. 10
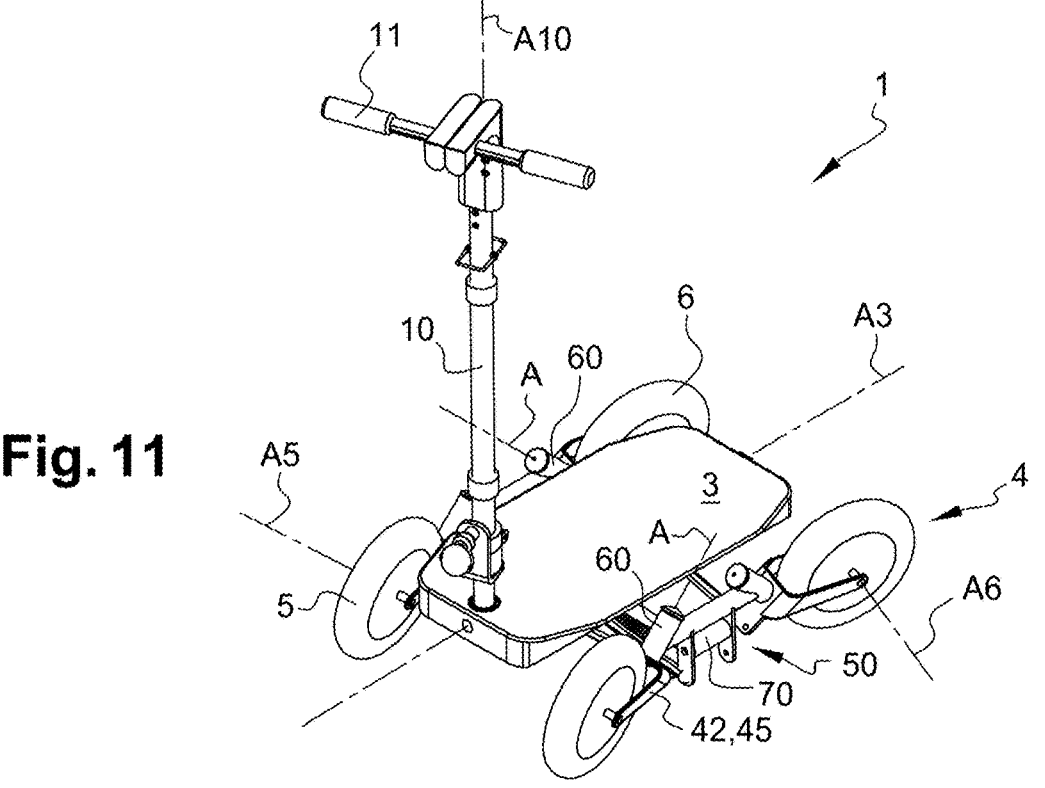
Fig. 11

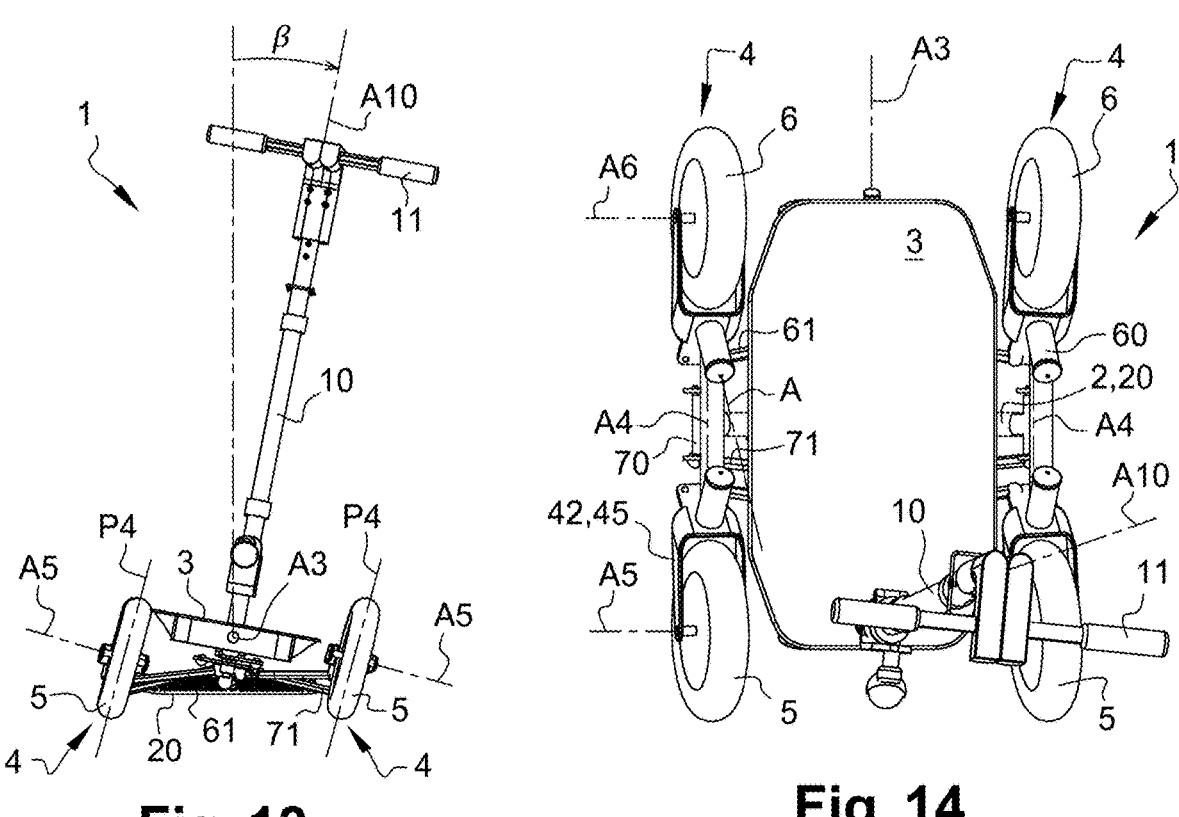
Fig. 13
Fig. 14
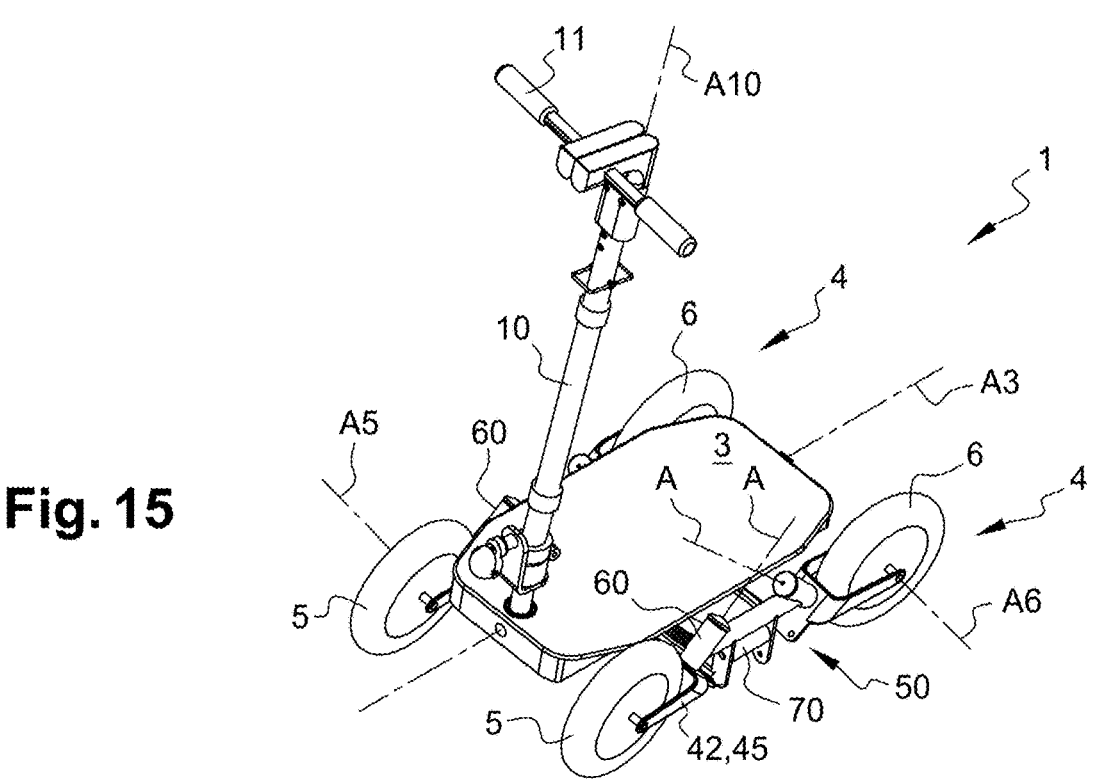
Fig. 15

Fig. 25
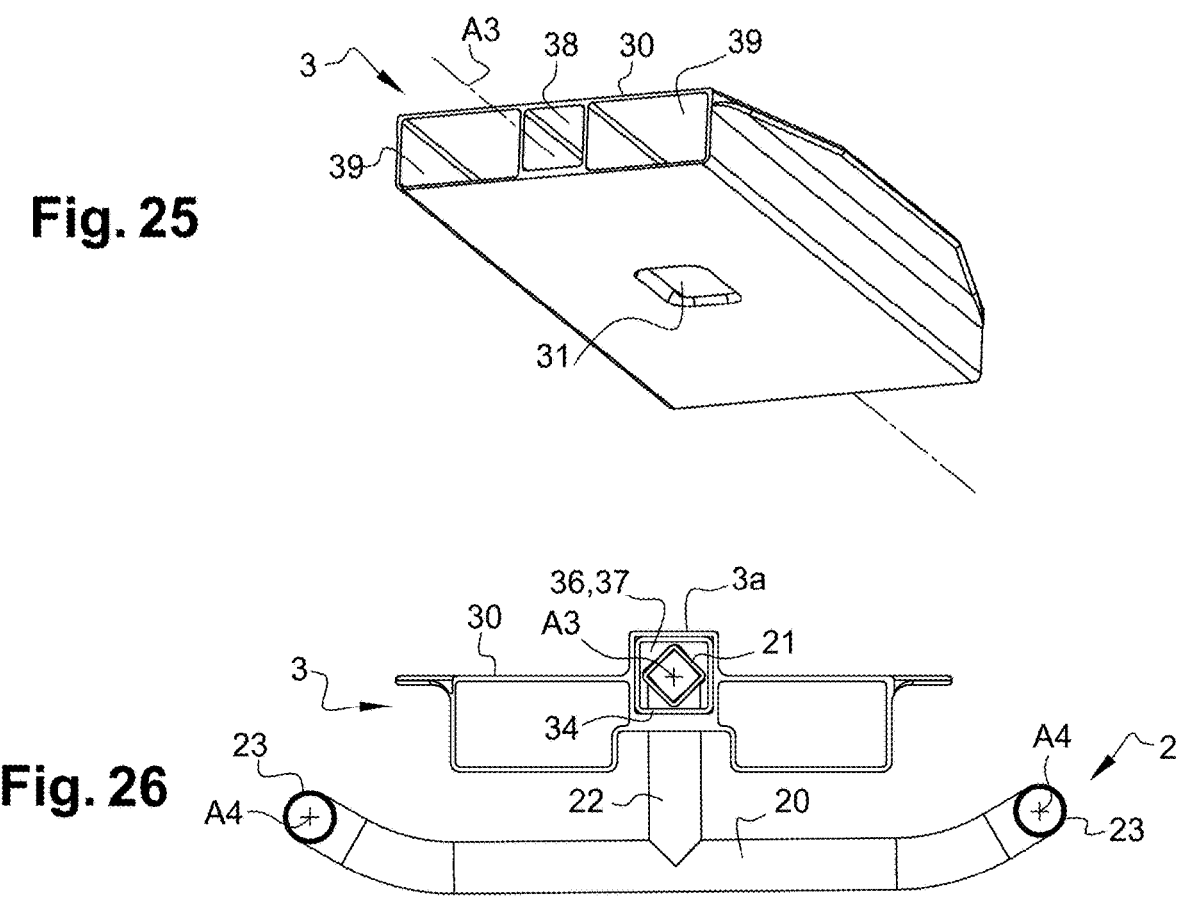
Fig. 26
Fig. 27
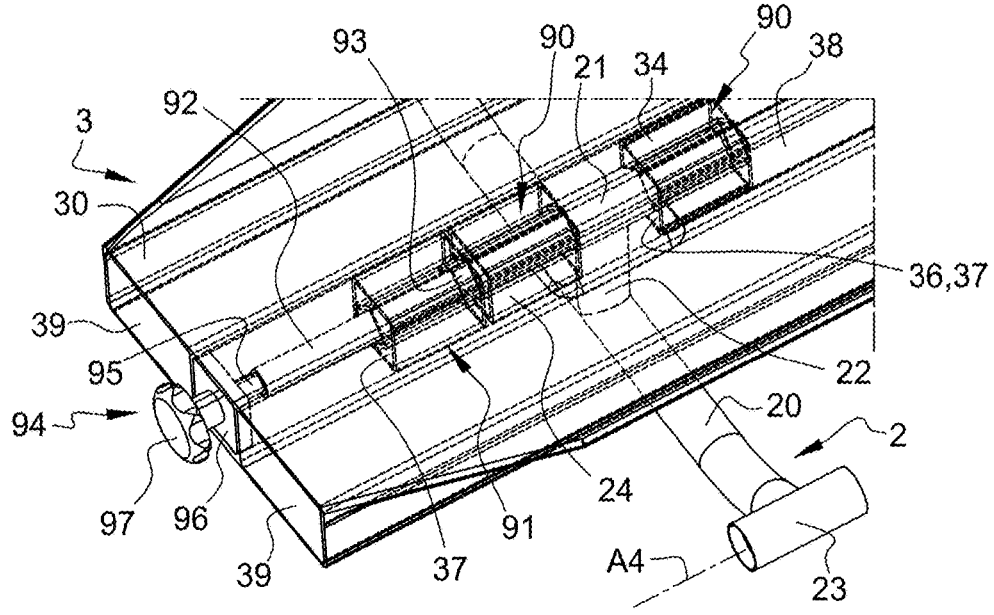

FOUR-WHEELED SCOOTER-TYPE VEHICLE

CROSS REFERENCE TO RELATED APPLICATIONS

This application is a National Stage of PCT Application No. PCT/FR20221051118 filed on Jun. 13, 2022, which claims priority to French Patent Application No. 21/06488 filed on Jun. 18, 2021, the contents each of which are incorporated herein by reference thereto.

TECHNICAL FIELD

The present disclosure concerns a scooter-type vehicle, that is to say a personal mobility device including a platform on which a user stands, in a frontal view, the platform being carried by wheels and provided with a steering column operated by the user.

BACKGROUND

The scooters are compact and lightweight vehicles, requiring no special driving skills, which allow a person to move easily and quickly, typically in urban environments. In addition, the electric scooters do not require any physical effort, which allows their use by a wide audience.

However, the known scooters are perceived by some people as unstable, unsafe, and/or difficult to handle. This is why these people give up using a scooter, despite the advantages of this type of vehicle.

BRIEF SUMMARY

The present disclosure aims to remedy the drawbacks mentioned above, by providing a scooter-type vehicle which may be used by a greater number of people.

To this end, the present disclosure concerns a scooter-type vehicle, defining a longitudinal direction, a transverse direction and a vertical direction in neutral position, the vehicle comprising:

a frame which includes a crossmember located in the vicinity of a median vertical transverse plane of the vehicle;

a platform on which a user is intended to stand, the platform being mounted on the crossmember of the frame in a pivoting manner about a first inclination axis which is longitudinal and median, the vehicle including means for returning the platform in neutral position, in which the platform is substantially horizontal;

a right running gear and a left running gear, each including a front wheel and a rear wheel, the front wheels and/or the rear wheels being steered, each running gear including, for each of the front and rear wheels, at least one arm which is arranged substantially parallel to the mid-plane of the wheel, each arm having one end linked to the axis of the wheel and another end mounted on a connecting piece, the arm of the steered wheel(s) being mounted on the corresponding connecting piece in a pivoting manner about a steering axis which, in neutral position, is disposed substantially in the plane of the wheel and is inclined downwards in the direction of the wheel, the connecting piece being mounted on the crossmember of the frame in a pivoting manner about a second inclination axis which is longitudinal and lateral;

a steering column configured to be gripped by the user, the steering column being mounted orthogonally on the platform, substantially vertically in neutral position, and in a pivoting manner about its axis relative to the platform;

a transfer device connecting the steering column and the arm of each steered wheel, so that the rotation of the steering column about its axis causes the steered wheels to turn by pivoting the wheels about the steering axis;

two coupling members, each coupling member connecting the platform and the connecting piece of one of the running gears, so that the inclination of the platform relative to the crossmember, by pivoting the platform about the first inclination axis, causes the inclination of each running gear relative to the crossmember, by pivoting the connecting piece about the second inclination axis;

the vehicle being devoid of axles.

In practice, the user is positioned standing on the pivoting platform, preferably in a frontal view with the feet placed side by side, the hands on the steering column, which is generally provided with a handlebar.

When stationary, due to its four wheels and means for returning the platform to neutral position, the vehicle stands on its own without the user needing to put one foot on the ground.

In operation, the user may on the one hand rotate the steering column about its axis, to turn the wheels and thus rotate the vehicle, as on a bicycle.

On the other hand, he can incline the platform about the first inclination axis which is longitudinal and median, either by acting on the steering column, or by transferring load from one foot to the other. This inclination concerns the assembly consisting of the platform and the steering column, which are integral in this movement. This inclination makes it possible to balance the centrifugal force whatever the speed and the radius of the corner.

These two, respectively turning and inclination, movements are therefore caused by distinct structural means and may thus be dissociated, even if, in practice, the user combines these two movements in an almost immediately intuitive, to orient the vehicle and keep it in a stable position of balance.

With the vehicle according to the present disclosure, there is no structurally imposed correspondence between a given inclination of the platform and a given turning angle or a given cornering radius, and vice versa. Thus, in particular, it is possible to be in balance in a curve approached quickly with a large radius requiring little turning but with a significant inclination.

It results from the structure of the vehicle according to the present disclosure:

a stability when stationary but also at very low speeds, unlike two-wheeled vehicles. This makes the use of the vehicle simpler and more reassuring for all types of people;

a great maneuverability and a great liveliness, with the possibility of extremely rapid changes of direction without the risk of losing balance, as there is no inertia felt although self-stability in a straight line is ensured;

a compensation for slopes, the vehicle keeping its plumb across a slope;

an improved safety compared to that of a two-wheeled vehicle because it is not dependent on a lack of skill in driving the two wheels or on the loss of grip of one wheel.

Furthermore, because each running gear is mounted on the frame at a crossmember arranged medially along the longitudinal direction of the vehicle, the structure of the vehicle may be considerably simplified and lightened.

Thus, the vehicle is devoid of axles, that is to say of axle connecting the front wheels and of axle connecting the rear wheels. Concretely, the frame may be devoid of a side rail which would extend at least from the axis of the front wheels to the axis of the rear wheels.

For each wheel, the end of the arm may be mounted on the connecting piece by a steering pivot having an axis forming the steering axis. According to one embodiment, the steering pivot is located between the wheels of the same gear, at a height lower than the height of the wheels. This arrangement makes it possible to avoid cumbersome steering pivots located above the wheel or laterally. Preferably, in neutral position, the steering axis of a wheel is inclined downwards in the direction of the wheel and passes substantially through the point of contact of the wheel with the ground, or below. Such an arrangement makes it possible to avoid the reactions in the steering and to promote returning in neutral position.

For each running gear, the connecting piece may be mounted on the crossmember of the frame by an inclination pivot having an axis forming the second inclination axis. According to one embodiment, the inclination pivot is, in neutral position, disposed substantially in the plane of the wheel, located at a height lower than the height of the wheels, preferably at a height lower than the distance between the ground and the platform. Disposing the inclination pivot in the lower part means that the reaction of the ground on the wheels generates a return to neutral effect. In combination with the means for returning the platform to neutral position, this ensures the stability of the platform and of the user, when stationary or at very low speed.

The inclination pivot and the steering pivot of the vehicle are distinct, which makes it possible to dissociate the turning movements of the wheels and the inclination movements of the platform.

The transfer device may comprise a series of interconnected pieces, the series including a lever fastened to the steering column and, for each steered wheel, a steering tie rod connecting the lever to the arm linked to the axis of the wheel.

The steering tie rod is not necessarily directly linked to the lever. Thus, the series of pieces may also include at least one tilter interposed between the lever and the steering tie rod.

The tilter(s) may be mounted on the platform in a pivoting manner parallel to the axis of the steering column. Without any other degree of freedom between the titers and the platform, the inclination of the platform (and that of the running gears) has no effect on the steering. Preferably the tilters are substantially adjacent to the lower face of the platform.

The frame may further include:

two lateral side rails which are each arranged at one end of the crossmember, each lateral side rail having an axis forming one of the second inclination axes;

a median side rail which is fastened to and above the crossmember and which has an axis forming the first inclination axis.

The steering column may include a base part linked to the platform and an upper part linked to the base part by a hinge, so that the steering column may be placed in a collapsed position where the upper part of the steering column is folded against the platform. Further, the vehicle may include a castor mounted on and forward of the base part of the steering column, the castor being configured to contact the ground when the steering column is in the collapsed position and the vehicle tilted so that the platform is substantially vertical with the two front wheels resting on the ground. Such a structure allows stable storage and with a reduced footprint of the vehicle. A locking in collapsed position of the steering column may be provided.

The platform may include:

a central cavity which extends longitudinally and which is configured to receive a part of the frame adjacent to the first inclination axis (A3), and the means for returning the platform to neutral position;

two lateral cavities which extend longitudinally and which are configured to each receive a battery and a device for controlling an electric motor coupled to the corresponding wheel.

The cavities may typically be open at their longitudinal ends, and a shutter may be provided at these ends.

The platform is for example made by extruding a metal such as aluminum.

According to one embodiment, the platform comprises a central cavity which extends longitudinally and which is configured to receive the means for returning the platform in neutral position, the return means including:

at least one base element assembled to the frame and to the platform;

at least one additional element that can be mounted in the central cavity and coupled to the base element, so as to modify the return force provided by the return means.

Provision can be made for the additional element to be housed in the central cavity and for the vehicle to include means for coupling/uncoupling the base element(s) and the additional element(s), and a member for controlling the coupling/decoupling means which can be actuated by a user.

BRIEF DESCRIPTION OF THE DRAWINGS

We now describe, by way of non-limiting example, a possible embodiment of the present disclosure, with reference to the appended figures:

FIG. 8 is a perspective view of the underside of the vehicle;

FIG. 9 is a front view of the vehicle, the wheels being turned and the platform horizontal;

FIG. 10 is a top view of the vehicle of FIG. 9;

FIG. 11 is a perspective view of the vehicle of FIG. 9;

FIG. 12 is a bottom view of the vehicle of FIG. 9;

FIG. 13 is a front view of the vehicle, the platform being inclined and the wheels being straight;

FIG. 14 is a top view of the vehicle of FIG. 13;

FIG. 15 is a perspective view of the vehicle of FIG. 13;

FIG. 16 is a bottom view of the vehicle of FIG. 13;

FIG. 25 is a perspective view of one embodiment of the platform of the vehicle;

FIG. 26 is a front view of the assembly comprising the frame and the platform, according to one variant;

FIG. 27 is a partial perspective view of the assembly comprising the frame and the platform, according to another variant.

DETAILED DESCRIPTION

Figures 1, 2, 3:
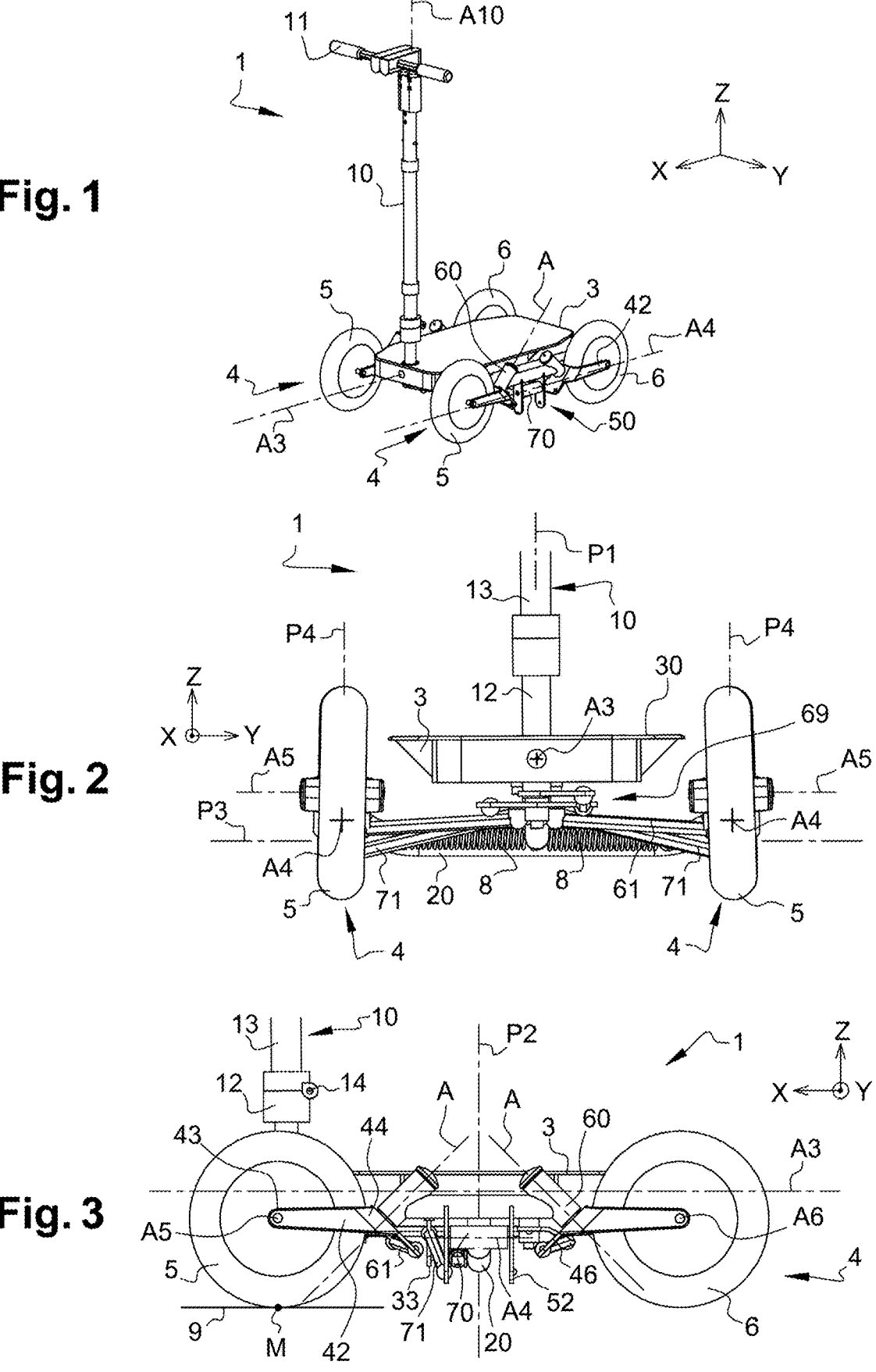
FIG. 1 is a perspective view of the vehicle according to the present disclosure, in neutral position.
FIG. 2 is a partial front view of the vehicle of FIG. 1.
FIG. 3 is a partial lateral view of the vehicle of FIG. 1.

FIG. 1 represents one embodiment of a scooter-type vehicle 1. The vehicle 1 comprises a frame 2, a platform 3 mounted on the frame 2, as well as two running gears 4 (namely a right running gear and a left running gear). Each running gear 4 is mounted on the frame 2 and includes a front wheel 5 and a rear wheel 6.

In FIGS. 1 to 3, the vehicle 1 is represented in neutral position, that is to say when it rests on a flat and horizontal surface and is stationary, the wheels 5, 6 and the platform 3 being oriented so that the vehicle 1 may move along a straight line.

Initially, the vehicle 1 will be described with reference to this neutral position.

The longitudinal direction X is defined as the general longitudinal direction of the vehicle 1, which is therefore substantially horizontal in neutral position. The terms "front", "rear" and "length" are used with reference to the direction X and to a displacement of the vehicle 1 forwards. The transverse direction Y is defined as the direction orthogonal to X and which is substantially horizontal in neutral position. The terms "left", "right", "lateral", "transverse" and "width" are used with reference to the direction Y. The term "inner" is defined with respect to a corner in which the vehicle 1 is engaged. Finally, the direction Z is defined as the direction orthogonal to X and Y, which is therefore substantially vertical in neutral position. The terms "height", "top" and "bottom" are used in reference to the direction Z.

As seen in particular in FIGS. 2 and 3, the vehicle 1 has a median longitudinal plane P1 parallel to (X,Z), which is preferably a plane of symmetry, and a median transverse plane P2 parallel to (Y,Z).

The frame 2 comprises a set of structural elements, for example of profiled type, on which all the other components of the vehicle 1 are attached, and which serve as a support for these other components.

The frame 2 comprises a crossmember 20 which is located adjacent to, or included in, the median transverse plane P2 of the vehicle 1. The crossmember 20 extends in the direction Y, and defines a horizontal mid-plane P3 represented on FIG. 2.

Figures 4, 5, 6, 7:
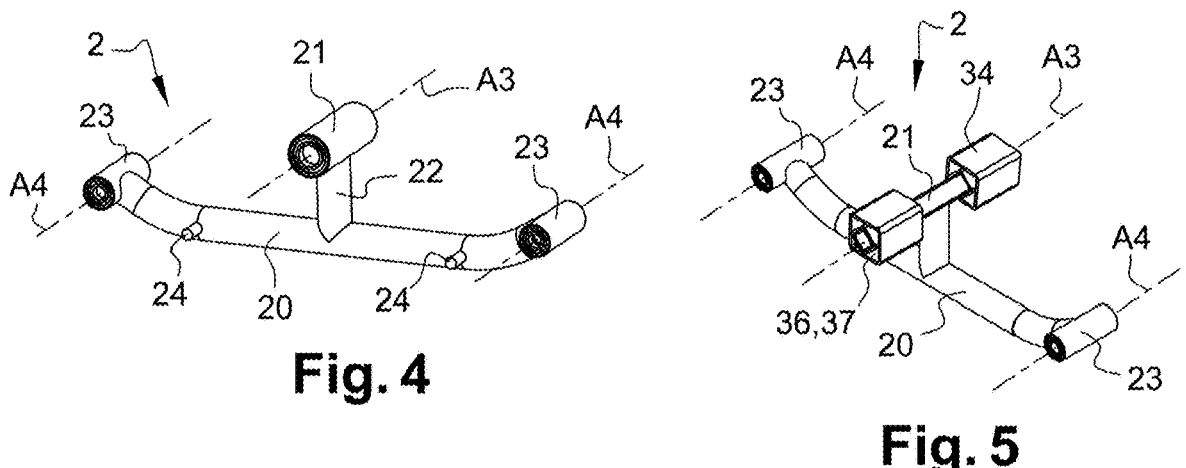
FIG. 4 is a perspective view of one embodiment of the frame of the vehicle.
FIG. 5 is a perspective view of another embodiment of the frame of the vehicle.
FIG. 6 is a perspective view of one embodiment of a running gear of the vehicle.
FIG. 7 is a perspective view of the underside of the platform and the steering column of the vehicle.

As illustrated on FIG. 4, the frame 2 may also include a median side rail 21 which is fastened to the crossmember 20, above the latter, for example via a vertical beam 22 of low height. The median side rail 21 makes it possible to mount the platform 3 on the frame 2, as will be described later. Preferably, as seen on FIG. 1, the median side rail 21 is completely housed in the platform 3, that is to say does not protrude longitudinally from the platform 3, neither forwards nor backwards.

In addition, the frame 2 may comprise two lateral side rails 23 secured to the crossmember 20, each arranged at one end of the crossmember 20 in the transverse direction Y. The crossmember 20, the vertical beam 22, the median side rail 21 and the lateral side rails 23 may be made of metal tubes of round or square section. The crossmember 20, the vertical beam 22, the side rail 21 and the lateral side rails 23 form part of or constitute the set of structural elements of the frame 2.

The platform 3 is intended to form a support for a standing user. Preferably, the platform 3 is wide enough for the user to be able to put his feet there side by side, for example symmetrically on either side of the median longitudinal plane P1. It is not necessary for the user to set foot on the ground since the four wheels 5, 6 of the vehicle 1 ensure its self-stability, including when stationary. The platform 3 includes a plate 30 on which the user's feet rest (FIG. 2).

The platform 3 is mounted on the crossmember 20 of the frame 2 in a pivoting manner about a first inclination axis A3 which is longitudinal and median. Concretely, the median side rail 21 of the frame 2 may be inserted into a longitudinal housing 31 provided in the lower part of the platform 3 (visible on FIG. 7). With this configuration, the median side rail 21 has an axis which, in mounted position, forms the first inclination axis A3.

In neutral position, the platform 3 is substantially horizontal (see in particular FIG. 2). The platform 3 may pivot about the first inclination axis A3 (see FIG. 13), as will be explained later. In addition, the vehicle 1 includes means for returning the platform 3 to neutral position.

In the embodiment represented on FIGS. 1 to 4, 7 and 8, in particular, these return means include two transverse springs 8 arranged symmetrically with respect to the median longitudinal plane P1. According to one possible embodiment, each of the springs 8 extends substantially transversely and has one end assembled to the platform 3 and one end assembled to the frame 2. For example, the lateral end of the spring 8 may be assembled to a stud 24 provided on the crossmember 20, and the opposite end of the spring 8 may be assembled to a stud 32 located in or near the median longitudinal plane P1 and secured to a lug 33 projecting from the lower face of the platform 3 downwards.

In the variant illustrated on FIG. 5, the median side rail 21 of the frame 2 is of square section. In addition, on either side of the vertical beam 22, in the longitudinal direction X, the median side rail 21 is mounted in a bar 34 of hollow, square section which is fastened under the platform 3 so that its axis is included in the plane P1.

The median side rail 21 is disposed inside the bar 34, coaxially, being rotated with respect to the bar 34 about the axis A3 by an angle of 45° (in neutral position). In addition, the bar 34 and the median side rail 21 have their sides dimensioned so that the vertices of the median side rail 21 are substantially adjacent to the sides of the bar 34. Four housings 36 in the shape of a prism with a triangular base are thus formed between the median side rail 21 and the bar 34. An elastomer member 37 is inserted into each of the housings 36, so as to substantially fill it. The elastomer member 37 makes it possible to ensure elastic return to neutral position accompanied by cushioning. For example, the bar 34 may be arranged so that two of its faces are orthogonal to the direction Z, in neutral position.

Thus, the platform 3 is mounted on the frame 2 by a first assembly device which is configured to allow the pivoting of the platform 3 about the axis A3, in other words the inclination of the platform 3, and to bias the platform 3 elastically to the neutral position.

A running gear 4 will now be described, it being specified that the left running gear and the right running gear are substantially identical but symmetrical with respect to the plane P1.

In neutral position, the running gear 4 defines a mid-plane P4 which is vertical and longitudinal (i.e. parallel to P1) and which is also the mid-plane of the front wheel 5 and of the rear wheel 6. The running gear 4 is moreover of symmetrical structure with respect to the plane P2—with the exception of the direction of rotation of the wheels 5, 6.

The front wheels 5 have an axis A5, and the rear wheels 6 have an axis A6. In neutral position, the axes A5 of the two front wheels 5 coincide, and the axes A6 of the two rear wheels 6 coincide.

In projection in a horizontal plane, the wheels 5, 6 may be arranged so that their centers are substantially at the four corners of the platform 3. Furthermore, with a user standing on the platform 3 with both feet side by side, we may have a platform 3 that is shorter than a classic two-wheeled scooter. It follows that the wheelbase of the vehicle 1 according to the present disclosure is reduced, which improves the maneuverability and reduces the footprint in the longitudinal direction.

According to the embodiments, the front wheels 5 and/or the rear wheels 6 are steered. The figures illustrate a vehicle 1 with four steered wheels, which is particularly easy to handle. It is however possible to provide only two steered wheels; in this case, the steered wheels are preferably the front wheels.

In neutral position, as seen in particular on FIG. 2, the horizontal mid-plane P3 of the crossmember 20 may be located lower than the axes A5, A6 of the wheels 5, 6; moreover, the platform 3 may be disposed substantially at the wheels 5, 6, in the vertical direction Z. More precisely, the platform 3 may be located above the axis A5, A6 of the wheels but below the highest point of the wheels.

The running gear 4 includes, for each of the front 5 and rear 6 wheels, at least one arm 42 which is arranged substantially parallel to the mid-plane of the wheel. More specifically, in neutral position, the arm 42 extends substantially longitudinally. The arm 42 has one end 43 linked to the axis of the wheel and another end 44 mounted on a connecting piece 50 itself mounted on the crossmember 20 of the frame 2. The connecting piece 50 may be disposed symmetrically between the front wheel 5 and the rear wheel 6, and mounted atone end of the crossmember 20.

In practice, each wheel 5, 6 may be associated with a fork 45 including two parallel arms 42 disposed on either side of the wheel and connected at their ends 44 by a bent portion.

The geometry of the forks 45 or wheel arms 42 is configured so that the reaction of the ground on the wheels 5, 6 tends to bring the wheels back into neutral, non-turned position, which contributes to the autostability.

The end 44 of the arm 42 of each steered wheel is mounted on the corresponding connecting piece in a pivoting manner about a steering axis A. In neutral position, the steering axis A is disposed substantially in the plane P4 of the wheel 5, 6 and is inclined downwards in the direction of the wheel. According to one possible embodiment, in neutral position, the steering axis A of a wheel is inclined downwards in the direction of the wheel. The steering axis A may pass under the point of contact M of the wheel with the ground 9 (see FIG. 3). In other words, the point of intersection between the steering axis A and the perpendicular to the ground 9 passing through the point of contact M between the wheel and the ground 9 is located lower than said point of contact M. Alternatively, the steering axis A may pass substantially through the point of contact M of the wheel with the ground 9. By way of example, and as illustrated on FIG. 3, the pivot axis A may be inclined relative to the vertical at an angle close to 45°.

In practice, for each wheel, the end 44 of the arm 42 may be mounted on the connecting piece 50 by a steering pivot 60 formed, for example, of a cylinder integral with the arm 42 engaged concentrically in a cylinder integral with the connecting piece 50, this steering pivot 60 having an axis forming the steering axis A. The steering pivot 60 may be located between the wheels 5, 6 of the same gear 4, at a height lower than the height of the wheels.

The connecting piece 50 is mounted on the crossmember 20 of the frame 2 in a pivoting manner about a second inclination axis A4 which is longitudinal and lateral, that is to say arranged laterally to the vehicle 1.

In practice, for each running gear 4, the connecting piece 50 may be mounted on the crossmember 20 of the frame 2 by a inclination pivot 70 formed for example of a cylinder or a rod integral with the connecting piece 50 and engaged in one of the lateral side rails 23 of the crossmember 20, concentrically. This inclination pivot 70 therefore has the axis of the corresponding lateral side rail 23 as its axis, and forms the second inclination axis A4.

As seen in FIGS. 3 and 6, the connecting piece 50 may include a central beam 51, connecting the steering pivots 60, from which project downwards two transverse lugs 52 between which the lateral side rail 23 may be mounted, in a pivoting manner.

In neutral position, the inclination pivot 70 may be disposed substantially in the plane P4 of the wheel 5, 6, and be located at a height lower than the height of the wheels, preferably at a height lower than the distance between the ground 9 and the platform 3.

Thus, the connecting piece 50 is mounted on the frame 2 by a second assembly device which is configured to allow the pivoting of the connecting piece 50 about the axis A4, in other words the inclination of the running gear 4.

The vehicle 1 is devoid of axles.

The vehicle 1 further comprises two coupling members 71 enabling the user of the vehicle 1 to control the inclination of each of the running gears 4 as a whole, that is to say the pivoting of the plane P4 about a longitudinal axis. Each coupling member 71 connects the platform 3 and the connecting piece 50 of one of the running gears 4, so that the inclination of the platform 3 relative to the crossmember 20, by pivoting the platform 3 about the first inclination axis A3, causes the inclination of each running gear 4 relative to the crossmember 2, by pivoting the connecting piece 50 about the second inclination axis A4.

As seen on FIG. 8, each coupling member 71 may be a tie rod including a rigid rod 72 provided with a ball joint 73 at each end. A ball joint 73 is linked to the platform 3, for example to the lug 33, and the other ball joint 73 is linked to the connecting piece 50, for example to one of the lugs 52, which may be the front lug 52. The coupling members 71 are thus disposed below the platform 3.

The coupling members 71 are disposed substantially symmetrically with respect to the plane P1. They can be inclined downwards from platform 3 in the direction of the running gear 4.

The vehicle 1 further comprises a steering column 10 which is configured to be able to be grasped by the user. To this end, the steering column 10 may be provided, near its upper end, with a handlebar 11 that the user may hold. The handlebar 11 extends for example transversely.

The steering column 10 is mounted orthogonally on the platform 3. It has an axis A10 which is substantially vertical in neutral position, and is preferably located in the front part of the platform 3, in the plane P1. The steering column 10 is mounted in a pivoting manner about its axis A10 relative to the platform 3.

Figure 23:
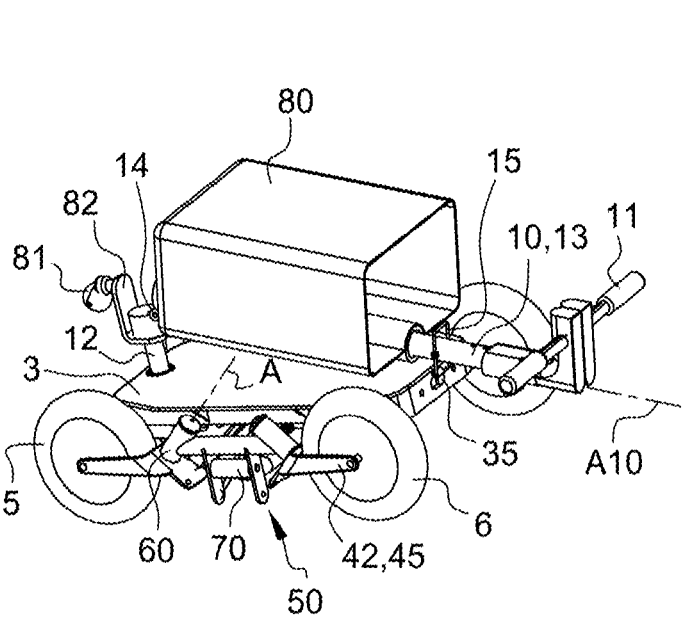
FIG. 23 represents the vehicle of FIG. 21, the steering column being in collapsed position.

The steering column 10 may include a base part 12 linked to the platform 3 and an upper part 13 linked to the base part 12 by a hinge 14. Thanks to the hinge 14, the steering column 10 may be placed in a collapsed position where the upper part 13 of the steering column 10 is folded against the platform 3, as seen in FIG. 23. It is possible to provide a device for locking the steering column 10 in the collapsed position. For example, the locking device includes a member 15 fastened to the upper part 13 of the steering column 10, here in the form of a metal wire forming a rectangle, and a hook 35 secured to the platform 3, at the rear of it, to cooperate with the member 15.

The vehicle 1 comprises a transfer device 69 connecting the steering column 10 and the arm 42 of each steered wheel 5, 6, so that the rotation of the steering column 10 about its axis A10 causes the steered wheels to be turned by pivoting the wheels about the steering axis A.

The transfer device 69 comprises a series of pieces linked together, to allow the transmission of the movement imparted to the steering column 10 to the steered wheels. The pieces of the transfer device 69 are preferably located under the platform 3.

This series of pieces comprises a lever 64 which is fastened to the steering column 10, and therefore rotates with it in an integral manner, about the axis A10. In addition, for each steered wheel, a steering tie rod 61 connects the lever 64 to the arm 42 linked to the axis of the wheel 5, 6.

When only the front wheels 5 of the vehicle 1 are steered, the steering tie rods 61 may directly connect the lever 64 to the arms 62.

When the vehicle 1 includes four steered wheels, as in the figures, the series of pieces of the transfer device 69 further includes at least one tilter 65 interposed between the lever 64 and the steering tie rod 61. The titer is a mechanical piece which makes it possible to transmit a movement by changing the direction and possibly the sense. Here, the titer makes it possible to transform a longitudinal movement into a transverse movement. The tilter(s) are mounted on the platform 3, on the lower face of the latter, in a pivoting manner parallel to the axis A10 of the steering column 10.

As seen on FIG. 8, the rotation of the lever 64 is transmitted by a first rod 66 to a front tilter 65. The rod 66 is articulated by its ends to the lever 64 and to the tilter 65 and is substantially longitudinal, in neutral position. The rotation of the front tilter 65 is transmitted by a second rod 67 to a rear tilter 65. The rod 67 is articulated by its ends to the front tilter 65 and to the rear titer 65, and is substantially longitudinal, in neutral position. The first rod 66 may be located on one side of the plane P1 and the second rod 67 on the other side of the plane P1, the transfer device 69 thus not being symmetrical with respect to the plane P1.

A steering tie rod 61 connects each wheel 5 to the front tilter 65 or each rear wheel 6 to the rear tilter 65. Each steering tie rod 61 includes a rigid rod 62 provided with a ball joint 63 at each end. A ball joint 63 is linked to the tilter 65, and the other ball joint 63 is linked to the arm 42 of the wheel, for example to a pad 46 secured to the arm 42 and inclined downwards in the direction of the other wheel of the same running gear 4.

The steering tie rods 61 of the front wheels 5—or of the rear wheels 6—are disposed substantially symmetrically with respect to the plane P1. They may be inclined downwards in the direction of the running gear 4.

The geometry of the anchoring points of the steering tie rods 61 makes it possible to respect the Ackermann diagram and to avoid scuffing of the wheels when cornering.

The vehicle 1 may include an electric motor coupled to each of the two front wheels 5 and/or to each of the two rear wheels 6. The motor may be housed in the hub of the concerned wheel, and is generally connected to rechargeable, removable or non-removable batteries. The handlebar 11 may comprise a member for controlling the acceleration of the motors.

Furthermore, the vehicle 1 may include a braking device associated with at least each of the two front 5 and/or rear 6 wheels. Due to the very short wheelbase of the vehicle 1, it can be provided that the braking is provided mainly by the rear wheels to avoid the risk of tilting forward in the event of emergency braking. The braking may be electrical and mechanical. The handlebar 11 may comprise a member for controlling the braking devices.

FIGS. 9 to 12 illustrate the vehicle 1 with the wheels 5, 6 turned. This turning results from the rotation of the steering column 10 about its axis A10, relative to the platform 3, by the action of the user. This is materialized on FIG. 10 by the angle α, between the steering column 10 in neutral position (illustrated in dotted lines) and the steering column 10 in turned position (illustrated in solid lines).

This rotation of the steering column 10 causes the rotation of the lever 64 of the transfer device 69, then, via the rods 66, 67, of the tilters 65 about an axis parallel to A10. As seen in FIG. 12, the steering tie rods 61 mounted on the tilter 65 pull or push the fork 45 of the concerned wheels 5, 6, thus causing the turning of the wheels, that is to say their pivoting about the steering axis A.

In a configuration with a vertical steering axis A—in neutral position—the rotation of the steering column 10 would result only in a turning of each wheel 5, 6, that is to say the inclination of their mid-plane about a vertical axis. The mid-plane of each wheel then remains vertical.

With the represented embodiment, where the steering axis A is inclined, the rotation of the steering column 10 results in a turning of each wheel 5, 6 but also in an inclination of each wheel 5, 6, which means that the mid-plane of each wheel is no longer vertical. This is clearly visible on the top view (FIG. 10).

On the other hand, the platform 3 remains horizontal, that is to say has not pivoted about the first inclination axis A3. Similarly, the connecting pieces 50 are not inclined, that is to say they are still in a longitudinal vertical plane, as seen on FIG. 10. The coupling members 71 have remained in the neutral position, as seen on FIG. 12.

In other words, the turning of the wheels did not lead to the inclination of the platform 3 nor the inclination of the running gear 4 as a whole. Only the wheels 5, 6 may have been individually inclined due to the inclination of steering axis A.

FIGS. 13 to 16 illustrate the vehicle 1 with the platform 3 inclined. This results from an action of the user who either pivoted the steering column 10 laterally in a plane (Y,Z), or transferred more load to one of its feet. This is materialized in FIG. 13 by the angle β, between the steering column 10 in neutral position and the steering column 10 in turned position.

This pivoting of the platform 3 about the first inclination axis A3 causes the pivoting of the connecting pieces 50 about the second inclination axis A4, via the coupling members 71. Indeed, as seen on FIG. 16, the coupling members 71 mounted on the platform 3 pull or push the connecting pieces 50.

Thus, as clearly shown on FIG. 13, each of the running gear 4 has pivoted as a whole. In other words, each of the planes P4 has pivoted relative to a longitudinal axis. Concretely, the platform 3 as well as each of the running gears 4 are inclined in a direction which corresponds to the inside of a corner, when the vehicle 1 is moving.

Insofar as the transfer device 69 is mounted under the platform 3, the inclination of the platform 3 causes a very slight displacement of the tilters 65 with respect to the neutral position, as can be seen on FIG. 16. The turning of the wheels 5, 6 which results from this is quite negligible, and almost imperceptible for the user. Reference will be made in particular to FIGS. 13 and 14 on which it may be seen that the mid-plane of the wheels 5, 6 is substantially coincident with the mid-plane P4 of the corresponding running gear 4.

In other words, the inclination of the platform 3 did not lead to the turning of the wheels 5, 6, or only led to a negligible turning thereof. The steering control is therefore not, or very little, affected by the inclination.

The two aforementioned movements, namely the turning of the wheels 5,6 and the inclination of the platform 3 and the running gear 4, although they are separate, are in practice combined by the user of the vehicle 1 to steer the vehicle 1 as he wishes. FIGS. 17 to 20 thus illustrate the vehicle 1 with the platform 3 inclined and the wheels 5, 6 turned.

Figure 17:
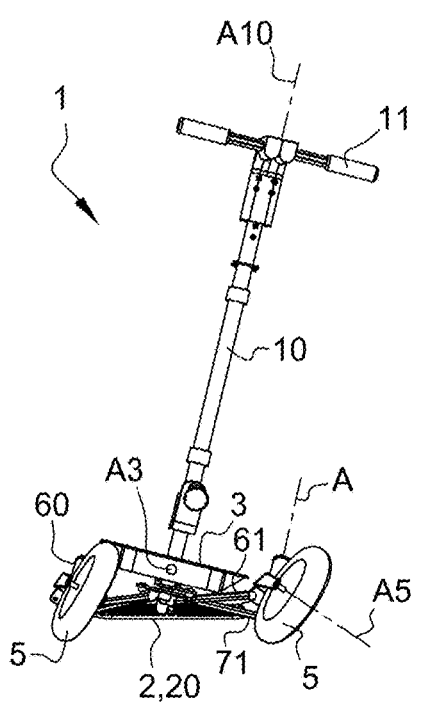
FIG. 17 is a front view of the vehicle, the wheels being turned and the platform inclined.
Figure 18:
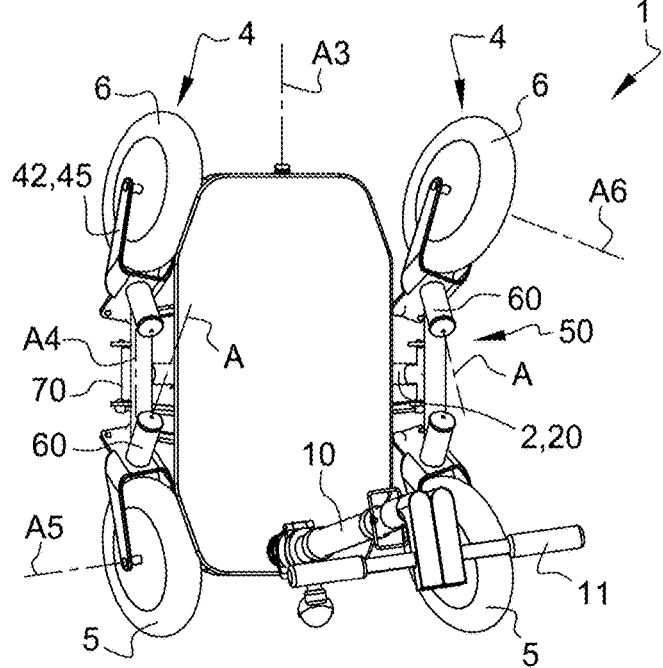
FIG. 18 is a top view of the vehicle of FIG. 17.
Figure 19:
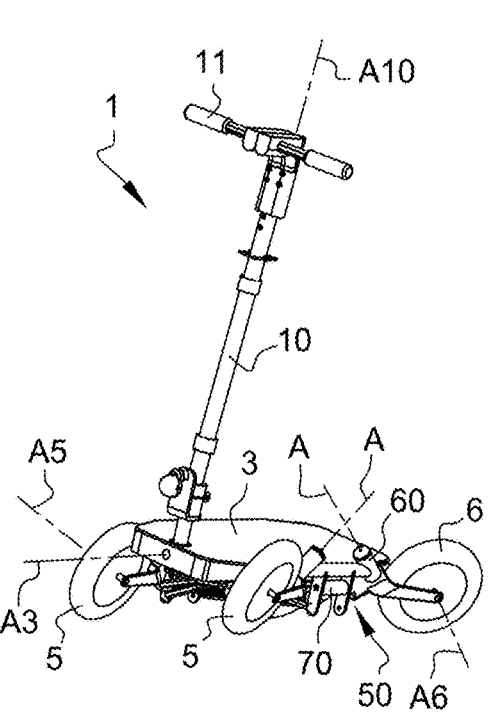
FIG. 19 is a perspective view of the vehicle of FIG. 17.
Figure 20:
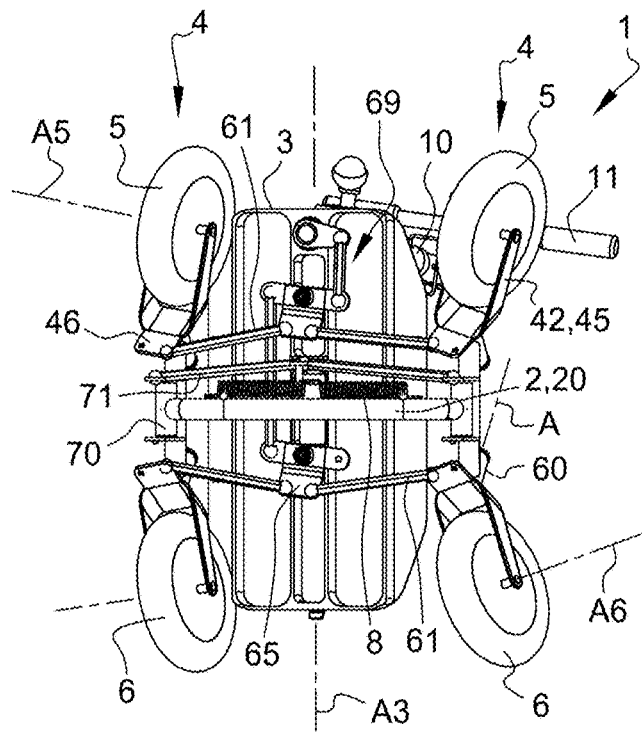
FIG. 20 is a bottom view of the vehicle of FIG. 17.

We observe at the same time:

an inclination of the platform 3 about the first inclination axis A3 and of the running gear 4 (and more specifically of the connecting piece 50) about the second inclination axis A4, particularly visible on FIGS. 17 and 18;

and a turning of the wheels 5, 6, that is to say a pivoting about the steering pivot A, associated with the rotation of the steering column 10 about its axis A10.

On the other hand, the frame 2 remains parallel to the ground.

It should be noted that the center of gravity of the vehicle 1 and of its user standing on the platform 3 is relatively high, and in particular much higher than the inclination pivots 70 since the user is standing. It follows that the inclination of the platform 3 cannot be passive, but must be caused by the user.

The return means 8 allow the platform 3 and the running gears 4 to return to neutral position outside of the cornering situations. These return means 8 ensure the stability when stationary and at very low speed.

Figure 21:
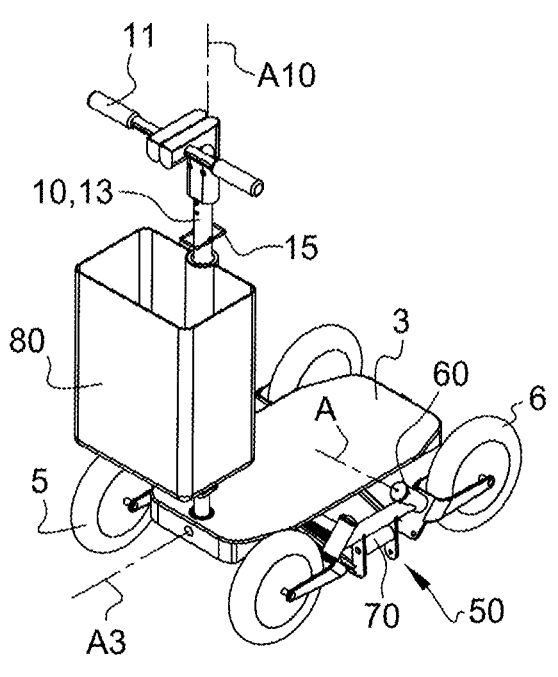
FIG. 21 is a perspective view of the vehicle provided with a receptacle, in front position.
Figure 22:
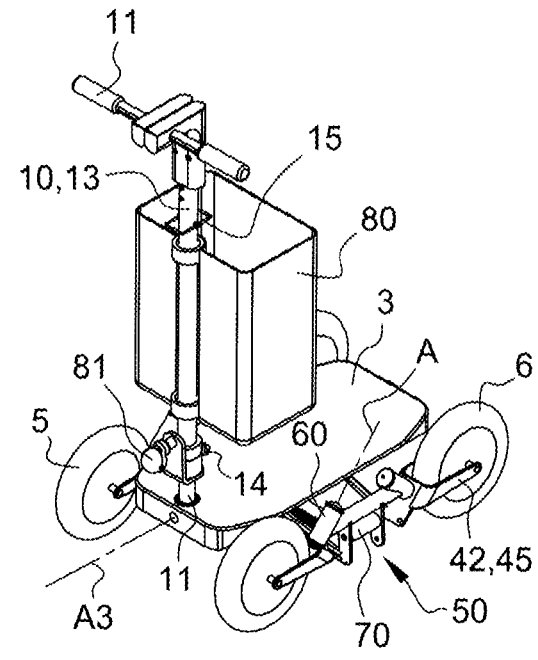
FIG. 22 is a view similar to FIG. 21, the receptacle being in rear position.

FIGS. 21 and 22 illustrate one embodiment in which the vehicle 1 includes a container 80, such as a basket, which is mounted on the steering column 10 in a rotatable manner about the axis A10 of the steering column 10. The container 80 may thus occupy a position at the front (FIG. 21), where it does not interfere with the positioning of the user on the platform 3, and pivot towards a position at the rear (FIG. 22). The vehicle 1 may then be used, by reversing its direction of travel and without operating its motors, like a shopping cart for shopping. In this rear position, the container 80 is above the platform 3, which limits the overall footprint and allows an easier access to the steering column 10 from the front of the vehicle 1. Such a vehicle 1 may therefore successively have an indoor use for transporting loads and an outdoor use for urban mobility without any adaptation. Moreover, as can be seen on FIG. 23, by placing the container 80 at the front, the latter does not prevent the steering column 10 from being placed in the collapsed position.

Figure 24:
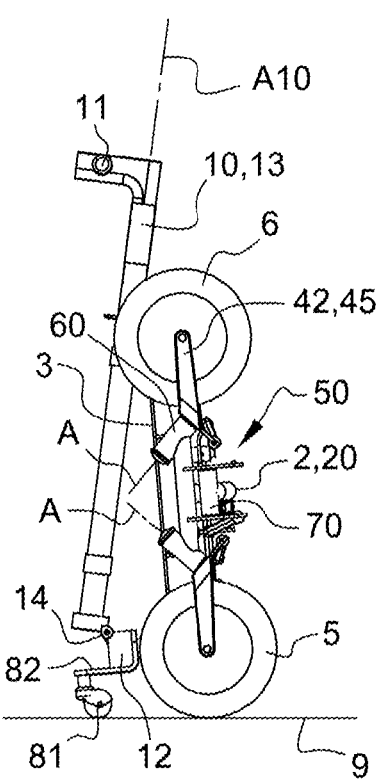
FIG. 24 represents the vehicle with the steering column in collapsed position, the vehicle being tilted substantially vertically.

Furthermore, the vehicle 1 may include a castor 81 mounted on and in front of the base part 12 of the steering column 10, for example via a bracket 82 (see in particular FIGS. 22 to 24). As illustrated in FIG. 24, the castor 81 is configured to be in contact with the ground 9 when the steering column 10 is in the collapsed position and the vehicle 1 tilted so that the platform 3 is substantially vertical with the two front wheels 5 resting on the ground 9.

In this position, the vehicle 1 is compact and stands alone, which facilitates its storage. By way of example, in this position, the vehicle 1 may have the following dimensions: approximately 1 m in height (overall along the axis A10), width close to 50 cm (in the direction Y), and thickness of about 35 cm perpendicular to the platform 3.

For an urban application, the footprint and the ground coverage of the vehicle 1 according to the present disclosure are less than those of a scooter-type two-wheeler, with a similar overall width (width of the handlebar 11) and a reduced length. When the steering column is folded, the vehicle 1 easily takes place in the trunk of a small car and may be carried in an elevator.

We now refer to FIG. 25.

According to the represented embodiment, the platform 3 may include three cavities extending longitudinally, namely:

a central cavity 38 receiving the median side rail 21 of the frame 2 and, with the embodiment of FIG. 5, the bars 34; in other words, the central cavity 38 may receive the mechanism for inclining the platform 3 and the means for returning to neutral;

and two, left and right, lateral cavities 39 symmetrical with respect to the median longitudinal plane P1 of the vehicle 1. These lateral cavities 39 may receive the batteries and electronic controllers of the left and right motors of the corresponding wheels 5, 6.

The various components received in the cavities 38, 39 are put in place by one or the other of the open ends of the cavities, then the cavities are closed by metal or plastic shutters 96 (see FIG. 27).

Such a platform 3 may be made by aluminum extrusion. It is thus simple to manufacture, rigid, light, and waterproof.

A variant of the assembly comprising the frame 20 and the platform 3 is illustrated in FIG. 26.

In the preceding figures, the first inclination axis A3 about which the platform 3 may pivot relative to the crossmember 20 is located below the plate 30 on which the user's feet rest, as may be seen in particular in FIG. 2.

One the variant of FIG. 26, the first inclination axis A3 is located substantially in the plane of the plate 30, and could even be located above. Such a configuration makes it possible to increase the stability. Consequently, the platform 3 has a longitudinal central boss 3a which does not interfere with the positioning of the feet on either side.

FIG. 27 shows one embodiment making it possible to adjust the means for returning the platform 3 in neutral position according to the weight of the user of the vehicle 1.

The weight of the users, which may vary from simple to triple (40 to 120 kg for example), calls for an adaptation of the calibration of the means for returning to neutral of the platform 3. Indeed, a return means that is too stiff for a light user will have for the effect of reducing or preventing the inclination of the platform 3 thus the correction of the centrifugal force. Conversely, a calibration that is too flexible for a heavy user will make returning to horizontal and stability when stationary problematic.

To this end, with the embodiment of FIG. 5, the elastomer members 37, playing the role of damped torsion springs, may be chosen with a calibration adapted to the user.

FIG. 27 illustrates a modular solution allowing a rapid change of the calibration on the same vehicle, so that the latter may be used by several users having different morphologies.

In this embodiment, the means for returning the platform 3 to neutral position include on the one hand a base element 90 assembled to the frame 2 and to the platform 3. This base element 90 may include, as previously described in connection with FIG. 5, an outer bar 34, of square section, fastened to the platform 3, and the side rail 21 forming an inner bar, of square section, fastened to the frame 2, elastomer members 37 being inserted into the housings 36 provided between these bars 21, 34. As illustrated on FIG. 27, there is preferably a base element 90 on each side of the median vertical transverse plane P2 of the vehicle 1, in particular if these base elements 90 form bearings between the platform 3 and the frame 2.

On the other hand, the means for returning the platform 3 include one or more additional elements 91, housed in the central cavity 38, coaxially with the base element 90 and with each other.

The additional element 91 may be coupled to the base element 90, so as to modify the return force provided by the return means as a whole. Each additional element 91 may have a structure identical to that of the base element 90 (namely outer bar, inner bar and elastomer members 37), or at least a compatible structure allowing the elements 90, 91 to be coupled together and thus an adjustment of the force of returning to neutral.

If several additional elements 91 are provided, these are also arranged to be able to be mutually coupled.

The vehicle 1 further includes a means for coupling/decoupling the elements between them (base element 90 and the or each additional element 91). This coupling means may be in the form of a tube 92 provided with at least one collar 93 of square section which, when it is engaged in two adjacent elements 90, 91, makes it possible to couple them in rotation about the axis A3.

The vehicle 1 further includes a member 94 for controlling the coupling/decoupling means, which may be actuated by a user. This control member 94 may include a threaded rod 95 engaged in an inner bore of the tube 92, passing through a shutter 96 arranged at one axial end of the central cavity 38. The control member 94 may further comprise a knob 97 fastened to the threaded rod 95, and located outside the platform, preferably at the back, so that it is easily accessible.

The rotation of the knob 97, therefore of the threaded rod 95, about the axis A3 causes the longitudinal translation of the tube 92 and of the collar(s) 93 it includes. When a collar 93 is entirely located in one element 90, 91 (more precisely in the inner bar of the element), the elements 90, 91 are decoupled; conversely, when a collar 93 is partially engaged in one element 90, 91 and partially in the adjacent element, these two elements are coupled in rotation about the first inclination axis A3.

Thus, the means for returning the platform 3 to neutral position are formed by one or more elements 90, 91 connected in series, so that the return force may be adjusted as required. The elements 90, 91 are advantageously housed permanently in the central cavity 38, whether they are all used or not, which prevents their loss and facilitates the operation of modifying the force of returning to neutral.

For example, it is possible to provide, in addition to the two base elements 90 arranged on either side of the crossmember 20, two additional elements 91 that can be connected, that is to say a total of two, three, or four elements 90, 91. Each element 90, 91 may for example have a longitudinal dimension in the range of one third of the length of the portion of the cavity 38, on one side of the crossmember 20, capable of receiving such elements.

It goes without saying that the present disclosure is not limited to the embodiment described above by way of example but that it comprises all the technical equivalents and the variants of the means described as well as their combinations.

The invention claimed is:

1. A scooter-type vehicle, defining a longitudinal direction, a transverse direction and a vertical direction in a neutral position, the vehicle comprises:

a frame which includes a crossmember located in the vicinity of a median vertical transverse plane of the vehicle;

a platform, the platform being mounted on the crossmember of the frame in a pivoting manner about a first inclination axis which is longitudinal and median, the vehicle including means for returning the platform in the neutral position, in which the platform is substantially horizontal;

a right running gear and a left running gear, each including a front wheel and a rear wheel, the front wheel of the right running gear and the left running gear and/or the rear wheel of the right running gear and the left running gear being steered, the right running gear and the left running gear each including, for each front wheel and each rear wheel, at least one arm which is arranged substantially parallel to a mid-plane of the front wheel and the rear wheel, the at least one arm having one end linked to an axis of the front wheel and the rear wheel and another end mounted on a connecting piece, the at least one arm being mounted on the connecting piece in a pivoting manner about a steering axis which, in the neutral position, is disposed substantially in a plane of the front wheel and the rear wheel and is inclined downwards in a direction of the front wheel and the rear wheel, the connecting piece being mounted on the crossmember of the frame in a pivoting manner about a second inclination axis which is longitudinal and lateral;

a steering column, the steering column being mounted orthogonally on the platform, substantially vertically in the neutral position, and in a pivoting manner about its axis relative to the platform;

a transfer device connecting the steering column and the at least one arm, so that rotation of the steering column about its axis causes the turning of the front wheel of the right running gear and the left running gear and the rear wheel of the right running gear and the left running gear by pivoting the front wheel of the right running gear and the left running gear and the rear wheel of the right running gear and the left running gear about the steering axis;

two coupling members, each connecting the platform and the connecting piece, so that inclination of the platform relative to the crossmember, by pivoting the platform about the first inclination axis, causes inclination of the right running gear and the left running gear relative to the crossmember, by pivoting the connecting piece about the second inclination axis; and wherein the vehicle is devoid of axles.

2. The vehicle according to claim 1, wherein, the another end is mounted on the connecting piece by a steering pivot having an axis forming the steering axis, the steering pivot being located between the front wheel and the rear wheel, at a height lower than a height of the front wheel and the rear wheel and wherein, in the neutral position, the steering axis of the front wheel and the rear wheel a wheel is inclined downwards in a direction of the front wheel and the rear wheel and passes substantially through a point of contact of the front wheel and the rear wheel with ground or below.

3. The vehicle according to claim 2, wherein the connecting piece is mounted on the crossmember of the frame by an inclination pivot having an axis forming the second inclination axis, the inclination pivot being, in the neutral position, disposed substantially in the plane of the front wheel and the rear wheel, located at a height lower than the height of the front wheel and the rear wheel, at a height lower than a distance between the ground and the platform.

4. The vehicle according to claim 3, wherein the transfer device comprises a series of interconnected pieces, the series of interconnected pieces including a lever fastened to the steering column and, for each front wheel and rear wheel, a steering tie rod connecting the lever to the at least one arm.

5. The vehicle according to claim 4, wherein the series of interconnected pieces further includes at least one tilter interposed between the lever and the steering tie rod, wherein the at least one tilter is mounted on the platform, substantially adjacent to a lower face of the platform, in a pivoting manner parallel to the axis of the steering column.

6. The vehicle according to claim 5, wherein the platform is wide enough for a user to put their feet side by side.

7. The vehicle according to claim 6, wherein the frame further comprises:

two lateral side rails which are each arranged at one end of the crossmember, the two lateral side rails each having an axis forming the second inclination axis;

a median side rail which is fastened to and above the crossmember, the median side rail having an axis forming the first inclination axis.

8. The vehicle according to claim 7, wherein the steering column includes a base part linked to the platform and an upper part linked to the base part by a hinge, so that the steering column may be placed in a collapsed position where the upper part of the steering column is folded against the platform, and wherein the vehicle includes a castor mounted on and in front of the base part of the steering column, the castor being configured to be in contact with ground when the steering column is in the collapsed position and the vehicle tilted so that the platform is substantially vertical with the front wheel resting on the ground.

9. The vehicle according to claim 1, wherein the transfer device comprises a series of interconnected pieces, the series of interconnected pieces including a lever fastened to the steering column and, for each front wheel and rear wheel, a steering tie rod connecting the lever to the at least one arm.

10. The vehicle according to claim 9, wherein the series of interconnected pieces further includes at least one tilter interposed between the lever and the steering tie rod, wherein the at least one tilter is mounted on the platform, substantially adjacent to a lower face of the platform, in a pivoting manner parallel to the axis of the steering column.

11. The vehicle according to claim 1, wherein the platform is wide enough for a user to put their feet side by side.

12. The vehicle according to claim 1, wherein the frame further comprises:

two lateral side rails which are each arranged at one end of the crossmember, the two lateral side rails each lateral side rail having an axis forming the second inclination axis;

a median side rail which is fastened to and above the crossmember, the median side rail having an axis forming the first inclination axis.

13. The vehicle according to claim 1, wherein the steering column includes a base part linked to the platform and an upper part linked to the base part by a hinge, so that the steering column may be placed in a collapsed position where the upper part of the steering column is folded against the platform, and wherein the vehicle includes a castor mounted on and in front of the base part of the steering column, the castor being configured to be in contact with ground when the steering column is in the collapsed position and the vehicle tilted so that the platform is substantially vertical with the front wheel resting on the ground.

14. The vehicle according to claim 1, further comprising it includes a container that is mounted on the steering column rotatably about the axis of the steering column between a position at a front of the steering column and a position at a rear of the steering column.

15. The vehicle according to claim 1, wherein the steering column is provided with a handlebar in an upper part, and wherein:

the vehicle includes an electric motor coupled to each front wheel and/or to each of rear wheel, and the handlebar comprises a member for controlling an acceleration of the electric motor;

and/or the vehicle includes a braking device associated with two of the front wheel and the rear wheel, and the handlebar comprises a member for controlling the braking device.

16. The vehicle according to claim 1, wherein the platform includes a plate on which feet of a user rest, and wherein the first inclination axis is located substantially in a plane of the plate.

17. The vehicle according to claim 1, wherein the platform includes:

a central cavity which extends longitudinally and which is configured to receive a part of the frame close to the first inclination axis, and the means for returning the platform to the neutral position;

two lateral cavities which extend longitudinally and which are configured to each receive a battery and a device for controlling an electric motor coupled to a respective front wheel and rear wheel;

the platform preferably being made by extruding a metal.

18. The vehicle as in claim 17, wherein the metal is aluminum.

19. The vehicle according to claim 1, wherein the platform comprises a central cavity which extends longitudinally and which is configured to receive the means for returning the platform to the neutral position, the return means including:

at least one base element assembled to the frame and to the platform;

at least one additional element which can be mounted in the central cavity and coupled to the at least one base element, so as to modify a return force provided by the means.

20. The vehicle according to claim 19, wherein the at least one additional element is housed in the central cavity and wherein the vehicle includes a means for coupling/decoupling the at least one base element and the at least one additional element, and a member for controlling the means for coupling/decoupling which may be actuated by a user.

\* \* \* \* \*